Nov. 7, 1939.   R. F. GAGG   2,178,960

COWLING

Filed Sept. 9, 1937

INVENTOR.
RUDOLPH F. GAGG
BY
ATTORNEY.

Patented Nov. 7, 1939

2,178,960

UNITED STATES PATENT OFFICE 2,178,960

COWLING

Rudolph F. Gagg, Fair Lawn, N. J., assignor to Wright Aeronautical Corporation, a corporation of New York Application September 9, 1937, Serial No. 163,017

7 Claims. (Cl. 123—171)

This invention relates to improvements in cowling systems for air cooled radial aircraft engines.

An object of the invention is to provide improved means for controlling the cooling airflow over a cowled-in engine, making use of the natural pressure zones outside of the cowling in maintaining the proper cooling airflow through the engine with a minimum of power loss.

Figure 2:
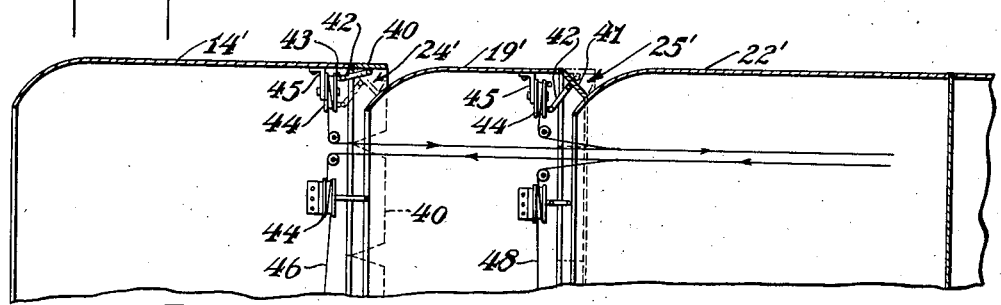
Figure 3:
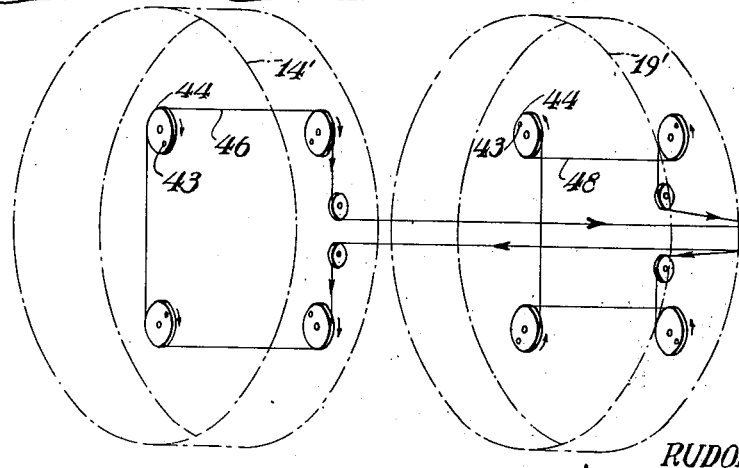

A further object is to provide a multi-part cowling organization having adjustable air exit openings for controlling airflow therethrough. Further objects and advantages of the invention will become apparent or will be pointed out in the detailed description below in connection with the drawing in which Fig. 1 is an axial section through a power plant cowling, showing the power plant in a diagrammatic manner, Fig. 2 is a fragmentary axial section through an alternative cowling arrangement, and Fig. 3 is a diagram showing the control system for the cowling arrangement of Fig. 2.

In the currently conventional installation of an air-cooled radial aircraft engine, the engine is embraced by a ring cowl inturned at its leading edge to define an axial air entrance opening between the propeller and engine. Cooling air passes between the cylinders of the engine and usually an annular air exit opening is provided between the engine cowling and the aircraft body. The external pressure characteristics on a cowling of this form may be summarized as follows: Immediately adjacent the inturned leading edge of the ring cowling the pressure is positive, gradually changing to negative a short distance rearward of the cowl leading edge. This negative pressure rises to a peak in a region approximately just back of the engine cylinders, gradually dropping off to 0, and then becoming positive farther back along the cowling and aircraft body. Fig. 1 shows a power plant 10 comprising a radial air cooled aircraft engine 11, a propeller 12 and engine accessories 13, the engine proper being embraced by a ring cowl 14 inturned at its leading edge 15 to define an axial air entrance opening 16. The cowling 14 may be attached to the engine 11 by clips 17. The cowling 14 terminates at a trailing edge 18 a short distance rearwardly of the engine, and an intermediate ring cowl 19 continues the streamline conformation of the cowl 14. Said intermediate cowl 19 is likewise inturned at its leading edge 20 and is straight at its trailing edge 21. A third rearward cowl portion 22 continues the form of the first two cowls, the cowl 22 having an inturned leading edge 23 entering within the trailing edge of the cowl 19. An annular air exit slot 24 is thus formed between the trailing edge 18 of the cowl 14 and the leading edge 20 of the cowl 19. Likewise, an annular air exit slot 25 is formed between the trailing edge 21 of the cowl 19 and the leading edge 23 of the cowl 22. The slot 24 is in a region where lowest pressure exists when the aircraft is in flight, while the slot 25 is in a region where the pressure is only a small amount less than atmospheric. Accordingly, means are provided to selectively use either the slot 24 or the slot 25 according to the operating conditions of the airplane.

During take-off and climb, when maximum power is being used and where the air speed is relatively low, all possible airflow is needed for proper cooling. Thus, it is desirable to use the air exit slot 24 for take-off and climb flight conditions since the low external pressure in the zone of this slot will induce a large volume of cooling airflow from the air entrance opening 16 and through the engine. Exhausting large quantities of cooling air from the slot 24 under normal cruising flight conditions would be disadvantageous, since the suction at the zone of the slot 25 would be reduced and drag upon the aircraft would be increased. Accordingly, for cruising conditions, where the cooling airflow requirement is not so great, the slot 25 should be used which automatically will cut down cooling airflow through the engine and at the same time lessen the drag caused by the issuance of air from the slot since said slot is in a zone close to normal atmospheric pressure.

Figure 1:
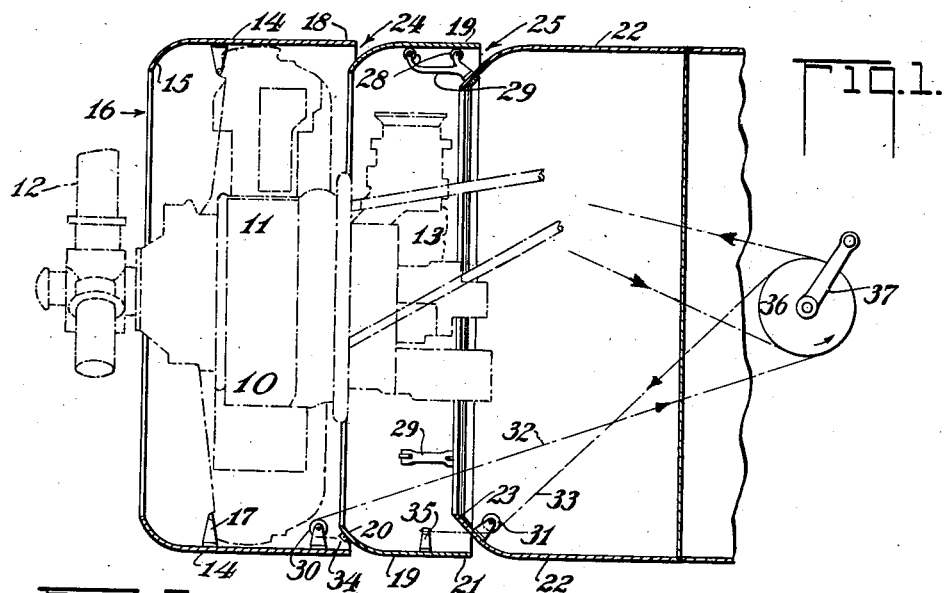

In Fig. 1, the intermediate cowl 19 is axially movable to reciprocally open and close the slots 24 and 25, the cowl being carried by rollers 28 mounted on brackets 29. Pulleys 30 and 31 are respectively mounted on the cowls 14 and 22 over which cables 32 and 33 respectively pass to anchorages 34 and 35 on the cowl 19. The cables 32 and 33 are led to a control pulley 36 having an operating crank 37.

For simplicity, only a single mounting arrangement involving the elements 28 and 29 is shown, and only a single cable unit involving the elements 31, 32, 33, 34 and 35 is shown, but it is understood that a plurality of these sets of units will be spaced circumferentially around the cowling to provide for proper support and equal movement of all parts of the cowling 19. If the handle 37 is turned counter-clockwise the cowling 19 will be moved forwardly to close the slot 24 and to open the slot 25, while, if the crank 37 is turned clockwise the slot 25 will be closed and the slot 24 will be opened. It will be apparent that other mechanical arrangements may be used to effect axial movement of the cowl 19.

Fig. 2 shows an alternative arrangement in which the cowls 14', 19' and 22', corresponding to the similarly numbered cowls of Fig. 1, are all fixed. These cowls form forward and rearward slots 24' and 25' which are opened and closed by sets of trailing edge flaps 40 and 41 respectively. The flaps of the sets are moved simultaneously through links 42 attached to each, the links being attached at their other ends to pivots 43 on sheaves 44 journalled on brackets 45 fixed to the cowls 14' and 19'. The sheaves carried on the cowl 14' are simultaneously turned by a cable 46 running over all of them, the cable extending rearwardly to a cockpit control pulley 47. The flaps of the set 41 are reciprocally simultaneously operated by elements corresponding to those just described, the sheaves 44 of the rearward set being interconnected by a cable 48 spliced into the cable 46. It will be noted that the cable 48 is reeved around the sheaves to cause rotation thereof in a direction opposite to that of the sheaves 44 of the forward set. Thus, the sets of flaps 40 and 41 are reciprocally and simultaneously movable so that, when the slot 24' is opened, the slot 25' is closed, and vice-versa.

While I have described my invention in detail in its present preferred embodiment, it will be obvious to those skilled in the art, after understanding my invention, that various changes and modifications may be made therein without departing from the spirit thereof. I aim in the appended claims to cover all such modifications and changes.

What I claim is:

1. In aircraft, a power plant comprising an engine embraced within a cowling system, said system having one air opening communicating with one side of the engine and having second and third air openings both communicating with the other side of the engine, said openings being so located in the system that the pressure difference, during and due to aircraft flight, is relatively great as between the first and second openings and is relatively small as between the first and third openings, and means for selectively changing the effective area of the second and third openings, said openings providing for cooling air entrance to and egress from the cowling interior.

2. In aircraft, a power plant comprising an engine embraced within a cowling system, said system having one air opening communicating with one side of the engine and having second and third air openings both communicating with the other side of the engine, said openings being so located in the system that the pressure difference, during and due to aircraft flight, is relatively great as between the first and second openings and is relatively small as between the first and third openings, and co-incidentally reciprocally operable means for closing the second opening and increasing the third and vice-versa, said openings providing for cooling air entrance to and egress from the cowling interior.

3. In aircraft, a power plant comprising an engine having a propeller forward thereof, a nose cowl annulus embracing the engine and having an inturned air entraining leading edge between the propeller and engine cylinders, air therefrom being adapted to pass the engine cylinders for cooling same, an intermediate cowl annulus having its leading edge spaced from the trailing edge of the nose cowl to form therewith a forward air exit annulus, a rear cowl annulus having its leading edge spaced from the trailing edge of the intermediate cowl to form therewith a rear air exit annulus, said exit annuli being respectively in zones of extreme low pressure and moderately low pressure in the aggregate cowl profile, and means for selectively and reciprocally controlling the effective area of said exit annuli.

4. In aircraft, a power plant comprising an engine having a propeller forward thereof, a nose cowl annulus embracing the engine and having an inturned air entraining leading edge between the propeller and engine cylinders, air therefrom being adapted to pass the engine cylinders for cooling same, an intermediate cowl annulus having its leading edge spaced from the trailing edge of the nose cowl to form therewith a forward air exit annulus, a rear cowl annulus having its leading edge spaced from the trailing edge of the intermediate cowl to form therewith a rear air exit annulus, said exit annuli being respectively in zones of extreme low pressure and moderately low pressure in the aggregate cowl profile, and means for selectively and reciprocally controlling the effective area of said exit annuli, said means comprising mechanism for moving the intermediate cowl forwardly to close and open the forward and rearward exit annuli respectively, and for moving said intermediate cowl rearwardly to open and close the forward and rearward exit annuli respectively.

5. In aircraft, a power plant comprising an engine having a propeller forward thereof, a nose cowl annulus embracing the engine and having an inturned air entraining leading edge between the propeller and engine cylinders, air therefrom being adapted to pass the engine cylinders for cooling same, an intermediate cowl annulus having its leading edge spaced from the trailing edge of the nose cowl to form therewith a forward air exit annulus, a rear cowl annulus having its leading edge spaced from the trailing edge of the intermediate cowl to form therewith a rear air exit annulus, said exit annuli being respectively in zones of extreme low pressure and moderately low pressure in the aggregate cowl profile, and means for selectively and reciprocally controlling the effective area of said exit annuli, said means comprising flaps attached to the cowls adjacent said exit annuli and mechanism operable to simultaneously move said flaps to open and close the forward and rearward exit annuli respectively, and vice-versa.

6. In aircraft, an enclosed cowling in the air stream adapted for airflow therethrough and thereover, having an air entrance opening in a relatively high pressure zone thereon, and having air exit openings respectively in extreme low pressure and moderate low pressure zones thereon, means for closing said exit openings, and mechanism to reciprocally operate said closing means to open one exit opening and close the other and vice-versa.

7. In aircraft, an enclosed cowling in the air stream adapted for airflow therethrough and thereover, having an air entrance opening in a relatively high pressure zone thereon, and having air exit openings respectively in extreme low pressure and moderate low pressure zones thereon, means for closing said exit openings, and mechanism to reciprocally operate said closing means to open one exit opening and close the other and vice-versa, said means comprising a member slidable to simultaneously close one opening and to open the other.

RUDOLPH F. GAGG.